US007933697B2

(12) United States Patent
Fukushima et al.

(10) Patent No.: US 7,933,697 B2
(45) Date of Patent: Apr. 26, 2011

(54) METHOD AND APPARATUS FOR RECORDING THE ROTATION ANGLE OF A VEHICLE

(75) Inventors: Shinya Fukushima, Kanagawa (JP); Makoto Oda, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 129 days.

(21) Appl. No.: 12/508,919

(22) Filed: Jul. 24, 2009

(65) Prior Publication Data

US 2010/0023208 A1 Jan. 28, 2010

(30) Foreign Application Priority Data

Jul. 24, 2008 (JP) ................................ 2008-191332
Jul. 15, 2009 (JP) ................................ 2009-167305

(51) Int. Cl.
*G06F 7/00* (2006.01)

(52) U.S. Cl. ........................................... 701/35; 701/70

(58) Field of Classification Search .................... 701/29, 701/35, 31, 36, 70, 207; 180/271, 274; 340/436, 340/438

See application file for complete search history.

(56) References Cited

U.S. PATENT DOCUMENTS 6,898,492 B2 * 5/2005 de Leon et al. ................ 701/35

FOREIGN PATENT DOCUMENTS

| | | |
|---|---|---|
| JP | 2002-267500 | 9/2002 |
| JP | 2003-72600 | 3/2003 |
| JP | 2006-151006 | 6/2006 |
| JP | 2007-4522 | 1/2007 |

* cited by examiner

*Primary Examiner* — Richard M. Camby

(74) *Attorney, Agent, or Firm* — Brinks Hofer Gilson & Lione

(57) ABSTRACT

An apparatus for recording the rotation angle of a vehicle comprises an angular velocity sensor adapted to measure an angular velocity ω of the vehicle, an integrator adapted to integrate the measured angular velocity ω across a predetermined unit of time Δt to calculate a differential rotation angle Δα in unit of time Δt, a ring buffer adapted to store the differential rotation angles Δαan acceleration sensor adapted to detect that an accident occurred with the vehicle, and a nonvolatile recording device adapted to record, when an accident is detected by the acceleration sensor, the differential rotation angles $\Delta\alpha_M \ldots \Delta\alpha_{M+N-1}$ stored in the ring buffer, across a predetermined recording time T before and after the accident.

10 Claims, 7 Drawing Sheets

METHOD AND APPARATUS FOR RECORDING THE ROTATION ANGLE OF A VEHICLE

CROSS REFERENCE TO RELATED APPLICATION

This application claims priority to Japanese Patent Application No. 2009-167305, filed Jul. 15, 2009, which is based on and claims priority to Japanese Patent Application No. 2008-191332, filed Jul. 24, 2008.

FIELD OF THE INVENTION

The present invention relates to a method and an apparatus for recording the rotation angle of a vehicle involved in an accident.

BACKGROUND OF THE INVENTION

When a vehicle is involved in an accident such as a rollover or collision, it is valuable to record the rotation angle of the vehicle before and after the accident. The recorded rotation angles make it possible to analyze the behavior of the vehicle and investigate the cause of the accident. In particular, the roll angle around the X-axis during the rollover illustrated in FIG. 1 is may be valuable. For example, Japanese Patent Publication No. 2003-72600 (Patent document 1) discloses a technique for recording the angular velocity before and after vehicle collision.

While an angular velocity sensor continually measures the angular velocity of a vehicle, the data required for analyzing vehicle behavior include the rotation angle of the vehicle just before and after the accident. Thus, there is no need to record vast data over a long period until an accident occurs. A ring buffer is a means for storing only a latest part of the vast data (disclosed for example in Japanese Patent Publication No. 2007-45221 (Patent Document 2)). Conceptually, a ring buffer is a memory arranged in a ring shape around which a write pointer moves circularly to replace the oldest data with new data, thereby continually storing a latest certain amount of data.

Use of a memory storage mechanism such as a ring buffer makes it possible to quickly store a certain amount of data. However, because the memory is volatile, such data needs to be moved to a non-volatile recording device when an accident occurs in order to preserve the data. Japanese Patent Publication No. 2006-151006 (Patent Document 3) discloses a technique for recording various data in a recording device when a value detected by an acceleration sensor of the vehicle exceeds a predetermined threshold.

However, with regard to Patent Document 1, this patent does not disclose a specific method for recording the rotation angle of a vehicle. Given that angular velocity is to be stored, the angular velocity needs to be measured and stored at an extremely short sampling interval of about 0.02 seconds, for example. Such a short sampling interval is required to sufficiently obtain the accuracy of the rotation angle calculated after an accident. In this case, however, several hundreds of angular velocity need to be stored in a buffer over a period of several seconds before and after an accident. Hence, an increase of buffer capacity may be required.

One possible solution may be to integrate the angular velocity detected after the angular velocity sensor begins measuring the angular velocity in order to record the total rotation angle of the vehicle every predetermined time point. For example, Japanese Patent Publication No. 2002-267500 (Patent Document 4) discloses a technique for integrating waveform detected by a sensor. However, when the angular velocity sensor has even the slightest offset (initial error) or noise, integration is continually performed with that offset or noise. As a result, the total rotation angle readily exceeds the storable range of the buffer, resulting in saturation and failure to store the necessary data.

The angular velocity sensor measures angular velocity by sensing an extremely low voltage, and is thus readily susceptible to offset and noise. While solutions such as ignoring the noise (establishing a dead zone) or applying a bias to converge measured values to zero are possible, these solutions are generally not accurate and require much time for processing.

Further, the angular velocity sensor has a measurement range and cannot output a value that exceeds the range. Thus, it is wasteful to prepare a recordable area in a recording device for recording rotation angles that will never be attained. Also in view of maintaining the resolution of recorded values, such a needless recordable area should be minimized.

SUMMARY OF THE INVENTION

The invention has been made in consideration of the above-described problem, and it is an object of the invention to provide a method and apparatus for recording the rotation angle of a vehicle that eliminate the offset effect of an angular velocity sensor, reliably record values detected before accident occurrence, and eliminate the need of a large-capacity recording device by efficient recording.

According to a first aspect of the present invention, a method is provided for recording the rotation angle of a vehicle comprising the steps of measuring the angular velocity of a vehicle, integrating the measured angular velocity across a predetermined unit of time to calculate a differential rotation angle in unit of time, storing the differential rotation angle in a buffer, and recording in a recording device when a vehicle accident is detected the differential rotation angles stored in the buffer across a predetermined recording time before and after the accident.

According to the first aspect of the present invention, the data stored in the buffer is each differential rotation angle in unit of time, and therefore it includes the offset only for unit of time. The buffer therefore never overflows, unlike the case where all the past angular velocity are integrated to record the total rotation angle.

Further, it is possible to save the buffer capacity as well by storing differential rotation angles, each of which occurs in unit of time, rather than the total rotation angle.

In the above method for recording the rotation angle of a vehicle, a total rotation angle up to an arbitrary point in time within the recording time may be calculated by reading the differential rotation angles recorded in the recording device and further by integrating the read differential rotation angles.

The data recorded in the recording device may be read after a long period of time has passed, such as several hours or days after the accident, rather than only immediately after the accident. The concept of the present invention is based on storing only differential rotation angles, each of which occurs in unit of time, so as to prevent buffer saturation during data storing, thereby making it possible to calculate the total rotation angle when reading the recorded data later.

The above method for recording the rotation angle of a vehicle may further comprise the steps of detecting whether or not an airbag of the vehicle has been deployed, and disabling replacement of the differential rotation angles recorded in the recording device in the case where the airbag has been deployed.

For example, when the angular velocity sensor or acceleration sensor provided in the vehicle exceeds a predetermined threshold, an assessment is made that an accident has occurred. However, another threshold at which the airbag is activated is sometimes higher than the threshold at which the assessment is made that an accident has occurred. As a result, the airbag does not always deploy when an accident is detected. Hence, whether or not the airbag has deployed is also detected. When the airbag has deployed, it is more definitive that an accident has occurred and thus replacement of the data recorded in the recording device is disabled so as to maintain the recorded data more adequately.

Accordingly, a second aspect of the present invention provides an apparatus for recording the rotation angle of a vehicle. The apparatus comprises an angular velocity sensor for measuring an angular velocity of a vehicle, an integrator for integrating the measured angular velocity across a predetermined unit of time to calculate a differential rotation angle in unit of time, a buffer for storing the differential rotation angles, an accident sensor for detecting that an accident occurred with the vehicle, and a recording device for recording, when an accident is detected by the accident sensor, the differential rotation angles stored in the buffer, across a predetermined recording time before and after the accident.

The above apparatus for recording the rotation angle of a vehicle may further comprise a reading device for reading the differential rotation angles recorded in the recording device, and an integrator for integrating the read differential rotation angles to calculate a total rotation angle at an arbitrary point in time within the recording time.

In the above apparatus for recording the rotation angle of a vehicle, the buffer may be a ring buffer capable of storing the differential rotation angles, each of which occurs in unit of time, across the recording time. This is effective as means for recording a latest part of the vast data.

The above apparatus for recording the rotation angle of a vehicle may further comprise an airbag deployment sensor for detecting whether or not an airbag of the vehicle has been deployed, and may disable replacement of the differential rotation angles recorded in the recording device when the airbag deployment sensor detects an airbag deployment.

In the above apparatus for recording the rotation angle of a vehicle, a recordable area of the recording device for recording the differential rotation angles may gradually increase along the time axis in the amount equivalent to a maximum or minimum differential rotation angle in unit of time determined based on a maximum or minimum angular velocity that can be output by the angular velocity sensor.

According to the above-described configuration, it is possible to design a recording device having an optimum capacity for the measurement range of an angular velocity sensor, omit waste, and thus maintain a proportionately higher resolution.

According to the present invention, it is possible to provide a method and an apparatus for recording the rotation angle of a vehicle capable of eliminating the offset effect of an angular velocity sensor, reliably recording values detected before an accident, and eliminating the need of a large-capacity recording device by efficient recording.

Particularly, in the case where roll angle data recorded in units of seconds during vehicle rollover are to be maintained, the memory capacity can be saved since a large memory capacity, as usually required, is not necessary.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

Figure 1:
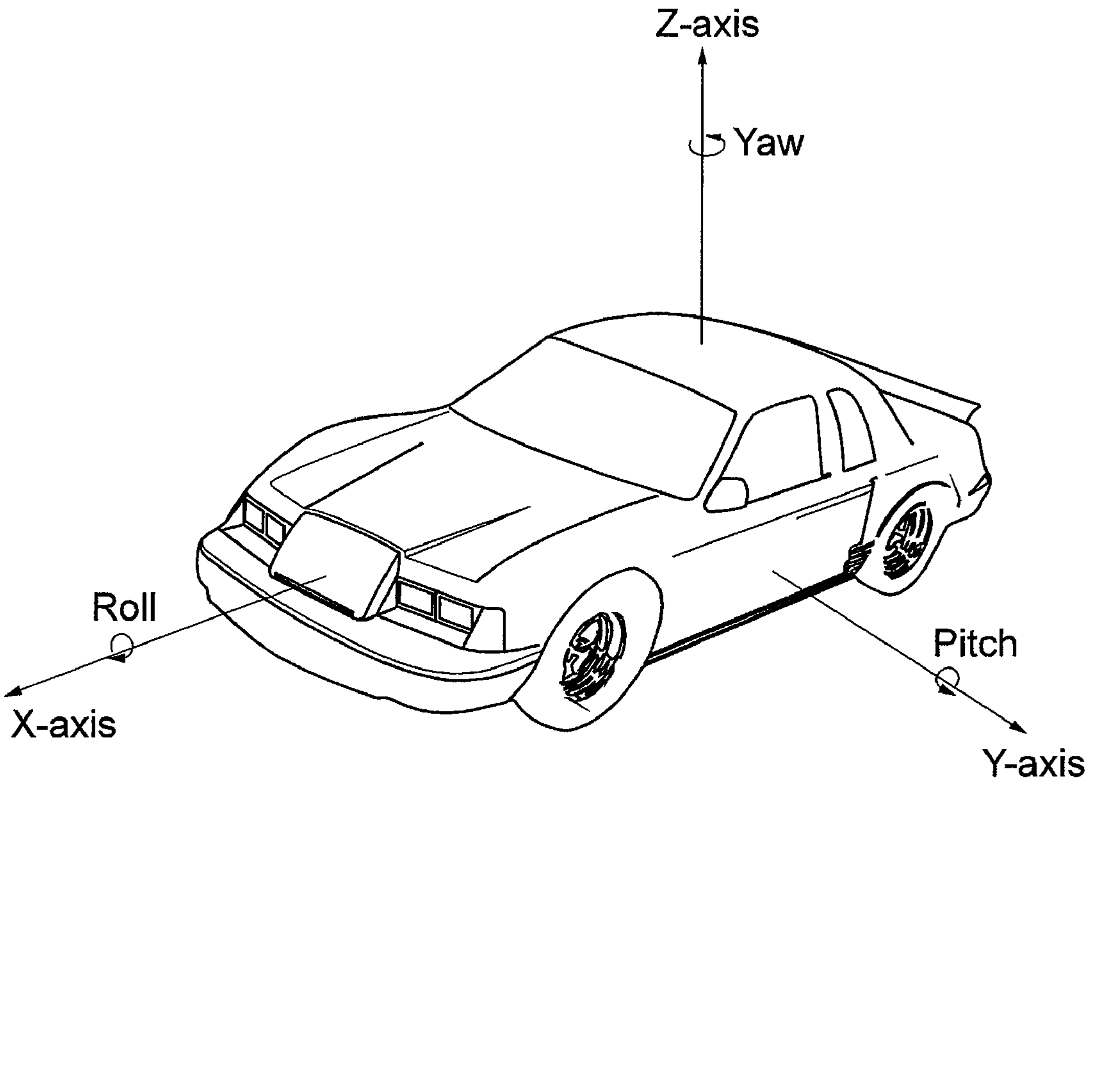
FIG. 1 is a diagram of rotation angles of a vehicle including a roll angle, pitch angle, and yaw angle.

The following describes in detail preferred embodiments of the present invention with reference to the accompanying drawings. The dimensions, materials, specific numeric values, and the like indicated in the following embodiments are mere illustrations for ease of understanding; the present invention is therefore not limited thereto unless otherwise stated. Elements in the specifications and drawings having substantially the same functions and configurations employ the same reference numerals, and duplicate descriptions thereof will be omitted. Additionally, elements not directly related to the present invention are omitted from the illustrations.

Figure 2B:
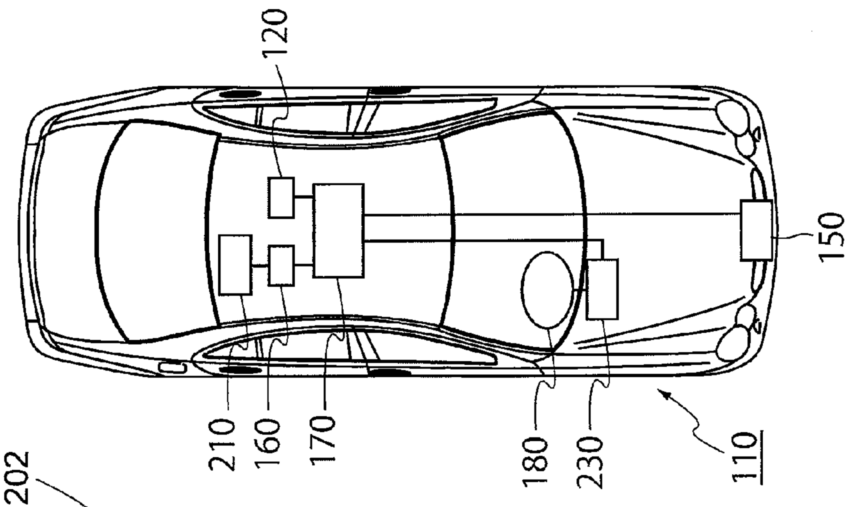
FIG. 2B shows a layout of each element of FIG. 2A within a vehicle.
Figure 2A:
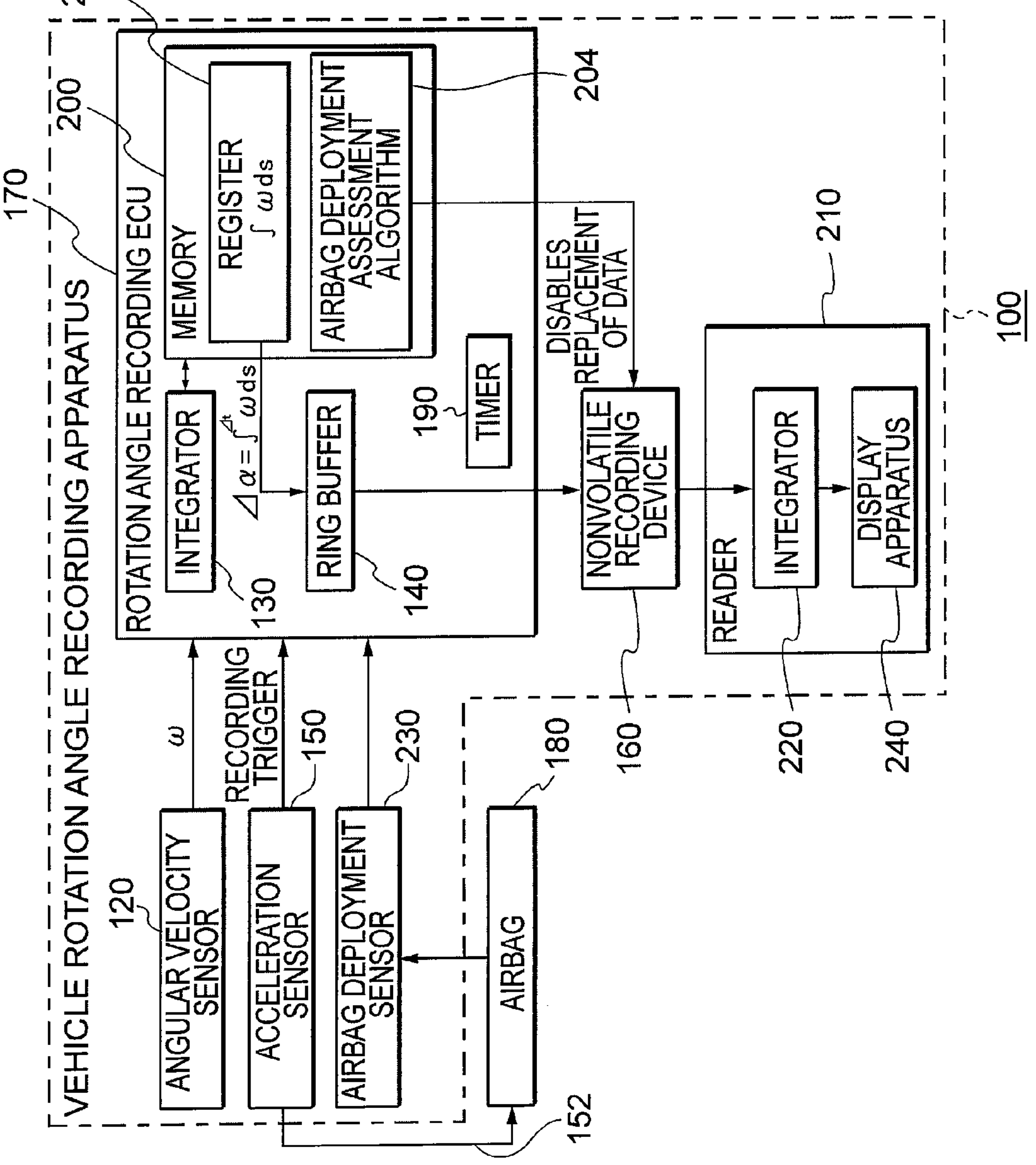
FIG. 2A is a block diagram illustrating an apparatus for recording the rotation angle of a vehicle in accordance with a first embodiment of the present invention.

FIG. 2A is a block diagram illustrating an apparatus 100 for recording the rotation angle of a vehicle of the first embodiment, and FIG. 2B shows a layout of each element of FIG. 2A within a vehicle 110.

The apparatus 100 for recording the rotation angle of a vehicle 110 comprises an angular velocity sensor 120 adapted to measure an angular velocity ω of the vehicle 110, an integrator 130 adapted to integrate the measured angular velocity ω across a predetermined unit of time Δt to calculate a differential rotation angle Δα in unit of time Δt, a buffer (ring buffer 140) adapted to store the differential rotation angle Δα in unit of time Δt, an accident sensor (acceleration sensor 150) adapted to detect that an accident occurred with the vehicle 110, and a nonvolatile recording device 160 adapted to record the differential rotation angles $\Delta\alpha_M \ldots \Delta\alpha_{M+N-1}$ stored in the buffer 140 across a predetermined recording time T before and after an accident detected by the acceleration sensor 150.

The angular velocity sensor 120 may detect either a roll angle around the X-axis only, or three angles around the three X, Y, and Z axes, for example. In the case of three axes, the angular velocities of the roll angle, pitch angle, and yaw angle around the respective axes are detected, and the apparatus 100 for recording the rotation angle of a vehicle in accordance with the present embodiment may be provided separately therefor.

The acceleration sensor 150 gives a recording trigger to a rotation angle recording electronic control unit (ECU) 170 (described later) when rollover or collision is detected and acceleration exceeds a predetermined first threshold. The acceleration sensor 150 may also be designed for three axes. The acceleration sensor 150 sends an operation signal 152 to an airbag 180 when acceleration exceeds a higher second threshold, causing the airbag 180 to deploy.

In this embodiment, the acceleration sensor 150 is used as the accident sensor that gives a recording trigger. However, the angular velocity sensor 120 may be used instead. In such a case, the first and second angular velocity thresholds are set so that the operation is the same. Since a main object of this embodiment is to record the roll angle (rotation angle around the X-axis; see, e.g., FIG. 1) during rollover, the accident sensor that gives the recording trigger is preferably the angular velocity sensor 120 rather than the acceleration sensor 150.

As illustrated in FIG. 2B, the acceleration sensor 150 is disposed at the front end of the vehicle, and the rotation angle recording ECU 170 is disposed at the vehicle center. The angular velocity sensor 120, the nonvolatile recording device 160, and a reader 210 are disposed near the rotation angle recording ECU 170. The airbag 180 is a steering wheel airbag. Note, however, that the layout illustrated in FIG. 2B is merely an example and it should therefore be understood to those of ordinary skill in the art that numerous variations of the layout are within the purview of the present invention. In addition, the airbag 180 may be any type of airbag known to those of ordinary skill in the art, such as, but not limited to, a side airbag.

Figure 3A:
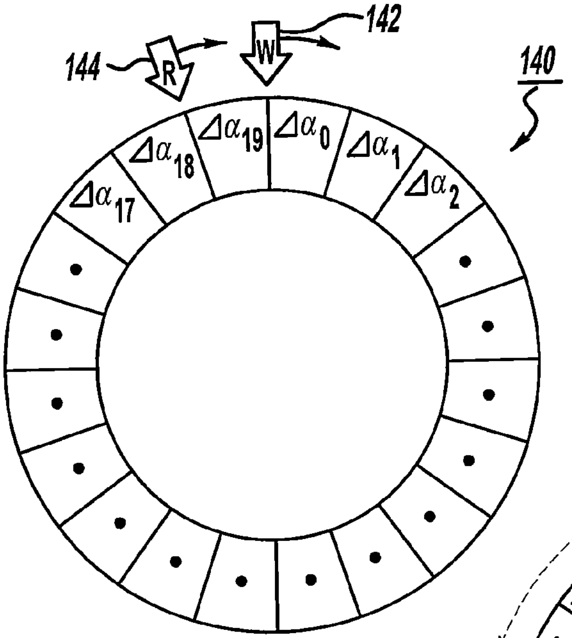
FIG. 3A is a schematic view of the ring buffer of FIG. 2A according to one embodiment of the present invention.
Figure 3C:
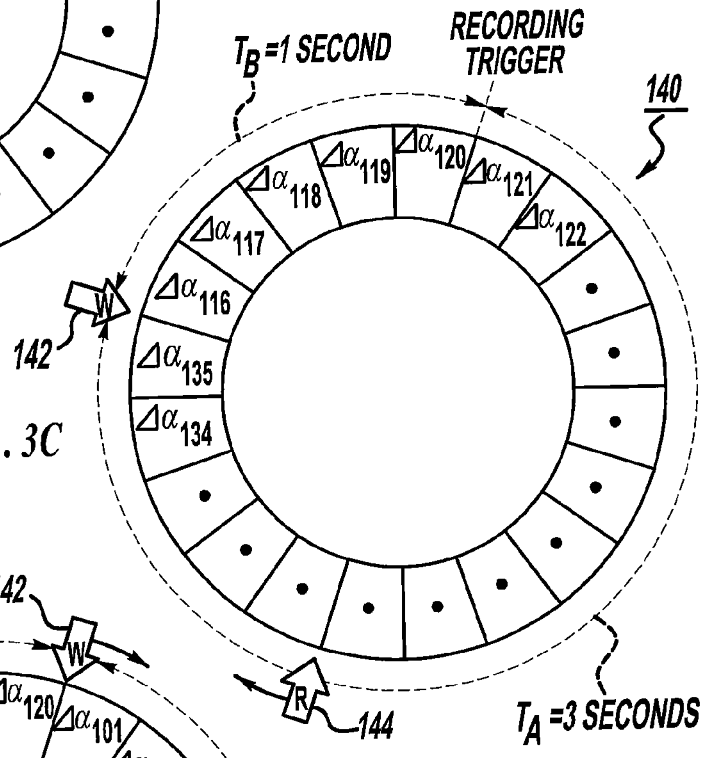
FIG. 3C is a schematic view of the ring buffer of FIG. 2A according to yet another embodiment of the present invention.
Figure 3B:
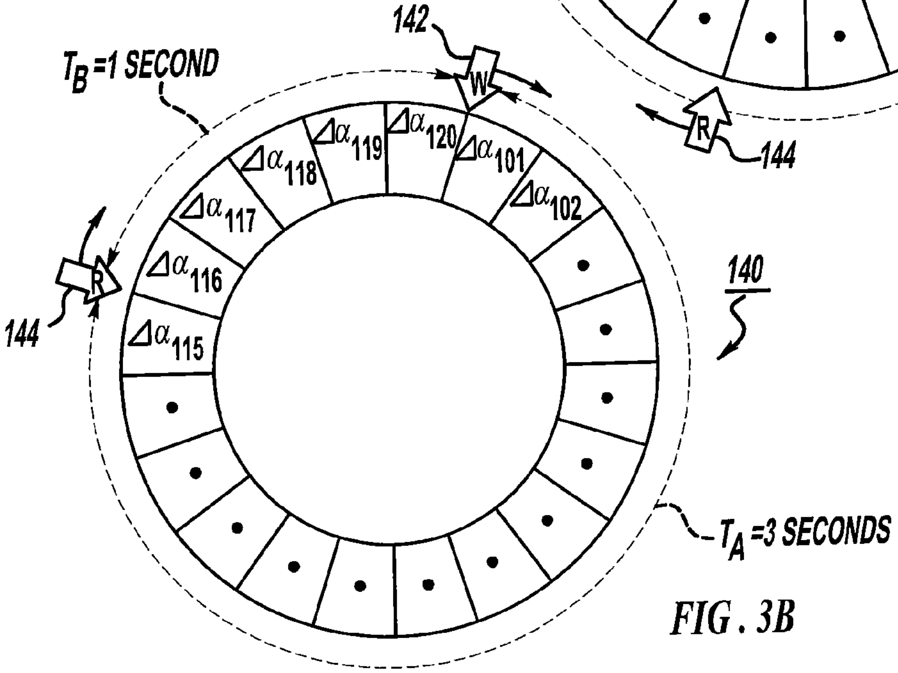
FIG. 3B is a schematic view of the ring buffer of FIG. 2A according to another embodiment of the present invention.

FIGS. 3A, 3B, and 3C are schematic views illustrating the ring buffer 140 of FIG. 2A. As illustrated in FIG. 3A, the ring buffer 140 is capable of recording the differential rotation angles $\Delta\alpha_M \ldots \Delta\alpha_{M+N-1}$, each of which occurs in unit of time Δt, across the recording time T only. In this embodiment, N differential rotation angles $\Delta\alpha_M$ to $\Delta\alpha_{M+19}$ (where N=20) are recordable in the ring buffer 140.

The recording of data in the ring buffer 140 is described below. Given a sampling interval ds of 0.02 seconds at which the angular velocity sensor 120 measures the angular velocity ω, the rotation angle recording ECU 170 uses the integrator 130 to consecutively integrate the measured angular velocity ω. That is to say, the ω·ds value is added one by one to a register 202 within a memory 200. When unit of time Δt (here, 0.2 seconds) has elapsed according to a timer 190, a write pointer 142 writes the integration result up to that time, that is calculated by an equation $\int^{\Delta t}\omega\cdot ds=\Delta\alpha_0$ in which ten ω·ds values are added, to the ring buffer 140. Note that the values of the sampling interval ds (0.02 seconds) and unit of time Δt (0.2 seconds) are merely examples, and may be freely defined within the range of about zero to a few seconds.

Subsequently, the same processing is repeated, and the write pointer 142, which moves clockwise conceptually, consecutively writes the N differential rotation angles $\Delta\alpha_0$ to $\Delta\alpha_{19}$ (where N=20) to the ring buffer 140. As shown in FIG. 3A, since 20 data values are recordable in the ring buffer 140, 20 differential rotation angles Δα, each of which occurs in unit of time Δt, across 4 (Δt×20) seconds (referred to as recording time T) can be recorded in the ring buffer 140. When the ring buffer 140 becomes full, the write pointer 142 moves further clockwise and replaces the oldest data with the newest data.

In this manner, the ring buffer 140 is effective as means for storing only a latest part of the vast data. While the number of data that can be stored in the ring buffer 140 is 20 in the present embodiment, it is to be understood that the present invention is not so limited, as the number of data stored therein can be freely increased or decreased.

The apparatus 100 for recording the rotation angle of a vehicle 110 further comprises the reader 210 adapted to read the differential rotation angles $\Delta\alpha_M$ to $\Delta\alpha_{M+19}$, each of which occurs in unit of time Δt, recorded in the nonvolatile recording device 160, and an integrator 220 adapted to integrate the differential rotation angles $\Delta\alpha_M$ to $\Delta\alpha_{M+19}$ to calculate the total rotation angle α up to an arbitrary point in time within the recording time T.

The apparatus 100 for recording the rotation angle of a vehicle 110 further includes an airbag deployment sensor 230 adapted to detect whether or not the airbag 180 of the vehicle 110 has been deployed, and is operable to disable replacement of the differential rotation angles recorded in the recording device when the airbag deployment sensor 230 detects airbag deployment.

Figure 4:
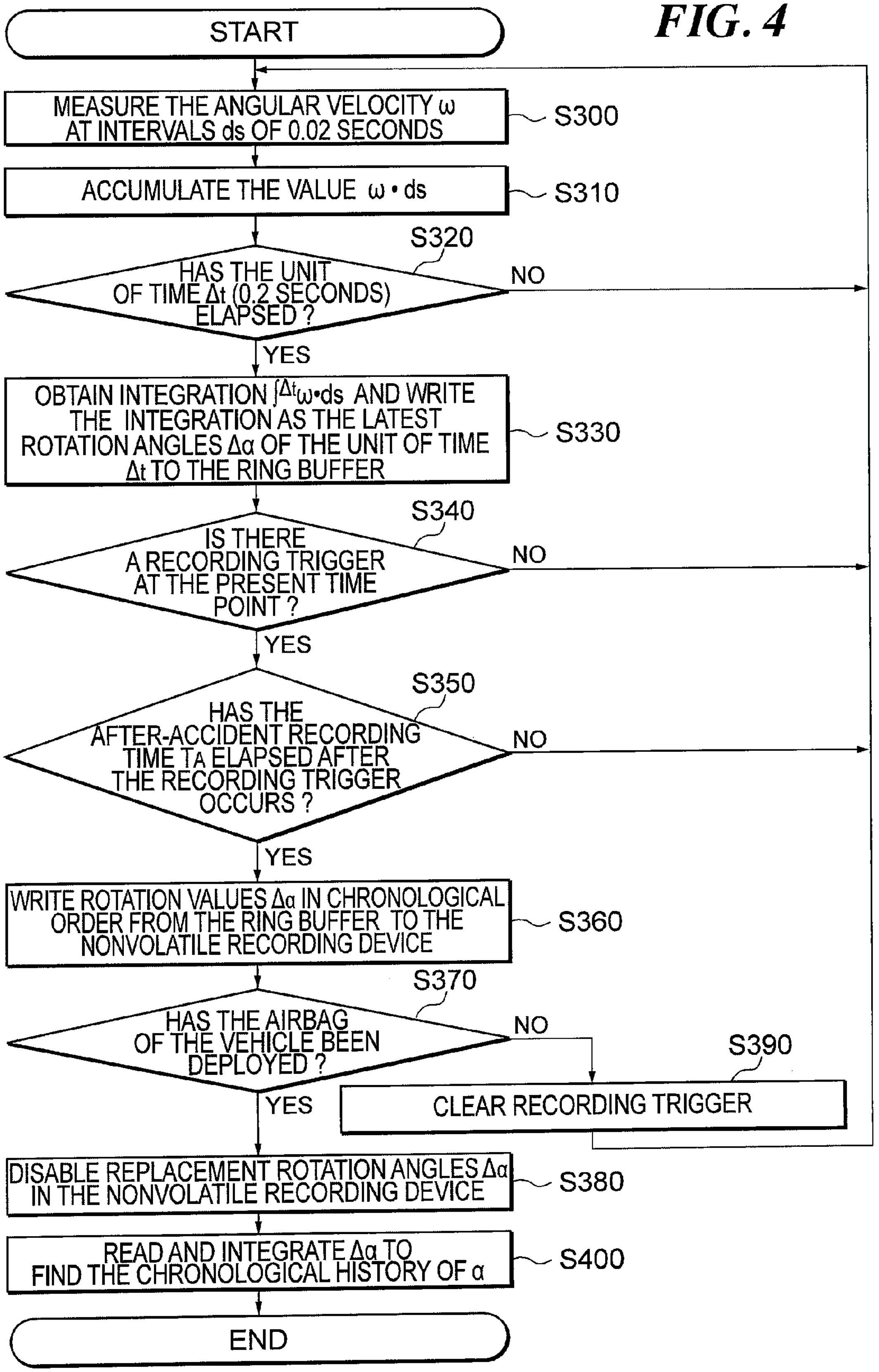
FIG. 4 is a flowchart illustrating a method for recording the rotation angle of a vehicle according to an embodiment of the present invention.

FIG. 4 is a flowchart illustrating a method for recording the rotation angle of a vehicle 110 in the case of using the apparatus 100 according to the first embodiment. First, the angular velocity sensor 120 of the apparatus 100 for recording the rotation angle of the vehicle 110 of FIG. 2A measures the angular velocity ω of the vehicle 110 (step S300). Measurement of this angular velocity co is continually performed, in this embodiment, at constant sampling intervals ds of 0.02 seconds.

The measured angular velocity ω is integrated by the integrator 130 so that a value ω·ds is consecutively accumulated (added) in the register 202 within the memory 200 (step S310). The integrator 130 checks whether or not unit of time Δt (0.2 seconds) has elapsed using the timer 190 each time a value ω·ds is accumulated (step S320), and repeats the above integration until the unit of time Δt has elapsed. Once unit of time Δt has elapsed, the integration result $\int^{\Delta t}\omega\cdot ds$ including ten values ω·ds is obtained, and thus the write pointer 142 writes the integration result as the latest differential rotation angle Δα (in unit of time Δt to the ring buffer 140 (step S330).

Next, the rotation angle recording ECU 170 checks whether or not there is a recording trigger at the present time point (step S340). The recording trigger is a signal that is sent to the rotation angle recording ECU 170 upon assessment that an accident has occurred in the case where the acceleration sensor 150 detects acceleration that exceeds the first threshold. In the case where there is no recording trigger, the method returns to step S300 where the latest differential rotation angle $\Delta\alpha$ in unit of time $\Delta t$ continues to be added to the ring buffer 140.

When the acceleration sensor 150 detects that an accident has occurred with the vehicle 110 and the recording trigger is generated, the differential rotation angles $\Delta\alpha$ stored in the ring buffer 140 across the predetermined recording time T (here, 4 seconds) before and after the accident is recorded in the nonvolatile recording device 160. In this embodiment, one object is to record the differential rotation angles of the vehicle 110 across the recording time T, which totals 4 seconds, in this manner. The recording time T is broken down into a 1-second period $T_B$ before the recording trigger (accident) occurrence, and a 3-second period $T_A$ after the recording trigger occurrence.

For example, as illustrated in FIG. 3B, a recording trigger occurs in step S340 after the write pointer 142 writes a differential rotation angle $\Delta\alpha_{120}$ to the ring buffer 140 in step S330. Then, after the recording trigger occurs, the rotation angle recording ECU 170 checks whether or not the after-accident recording time $T_A$ has elapsed using the timer 190 (step S350). In the case where the after-accident recording time $T_A$ has not elapsed, the flow returns to step S300 where the latest differential rotation angle $\Delta\alpha$ in unit of time $\Delta t$ continues to be added to the ring buffer 140 until the after-accident recording time $T_A$ elapses. Eventually, as illustrated in FIG. 3C, a new differential rotation angle $\Delta\alpha$ for the after-accident recording time $T_A$ is added to the ring buffer 140.

On the other hand, a read pointer 144, as illustrated in FIG. 3B, makes preparations for reading data starting from the position located before-accident recording time $T_B$ back from the position of the write pointer 142 where the recording trigger occurred. Then, when the after-accident recording time $T_A$ elapses, as illustrated in FIG. 3C, the differential rotation angles $\Delta\alpha$ across the recording time T (equivalent to one cycle of the ring buffer 140) are written in chronological order from the ring buffer 140 to the nonvolatile recording device 160 while moving clockwise (step S360). Note that when the recording trigger occurs, the read pointer 144 may begin reading the ring buffer 140 without waiting for the after-accident recording time $T_A$ to elapse.

Twenty sets of data recorded in the nonvolatile recording device 160 as described above are the differential rotation angles $\Delta\alpha$ each of which occurs in unit of time $\Delta t$, across the recording time T before and after the accident [4 seconds: 1-second before-accident recording time ($T_B$) and 3-second after-accident recording time ($T_A$)].

Since the ring buffer 140 is volatile, it is not appropriate for maintaining a large capacity to store large amounts of data from the standpoint of safety and the like. Thus, as previously described, the latest data are moved to the nonvolatile recording device 160 only when the need arises (e.g., when an accident occurs).

The rotation angle recording ECU 170 further assesses whether or not a signal from the airbag deployment sensor 230 has been received using an airbag deployment assessment algorithm 204. With this arrangement, the rotation angle recording ECU 170 detects whether or not the airbag 180 of the vehicle 110 has been deployed (step S370). The acceleration sensor 150 outputs the recording trigger when acceleration exceeds the first threshold, and the airbag 180 deploys when acceleration exceeds the larger second threshold. Thus, even if the recording trigger is outputted, the airbag 180 is not always deployed.

In the case where the airbag 180 deploys, the rotation angle recording ECU 170 disables replacement of the differential rotation angles $\Delta\alpha$ recorded in the nonvolatile recording device 160 (step S380). This enables recorded contents to be more adequately maintained.

On the other hand, in the case where a recording trigger occurs but the airbag 180 does not deploy, the recording trigger is cleared (step S390) and the method returns once again to step S300 where data storage to the ring buffer 140 and recording to the nonvolatile recording device 160 at the time of an accident are repeated. When a recording trigger occurs but the airbag 180 does not actually deploy, the incident is regarded as a minor impact, not an accident.

In step S380, in the case where replacement of the data recorded in the nonvolatile recording device 160 is disabled, recorded data are then lastly read from the nonvolatile recording device 160 (step S400). When these recorded data are read, differential rotation angles $\Delta\alpha$ are consecutively integrated by the integrator 220 to find the chronological history of the total rotation angle $\alpha$.

Figure 5A:
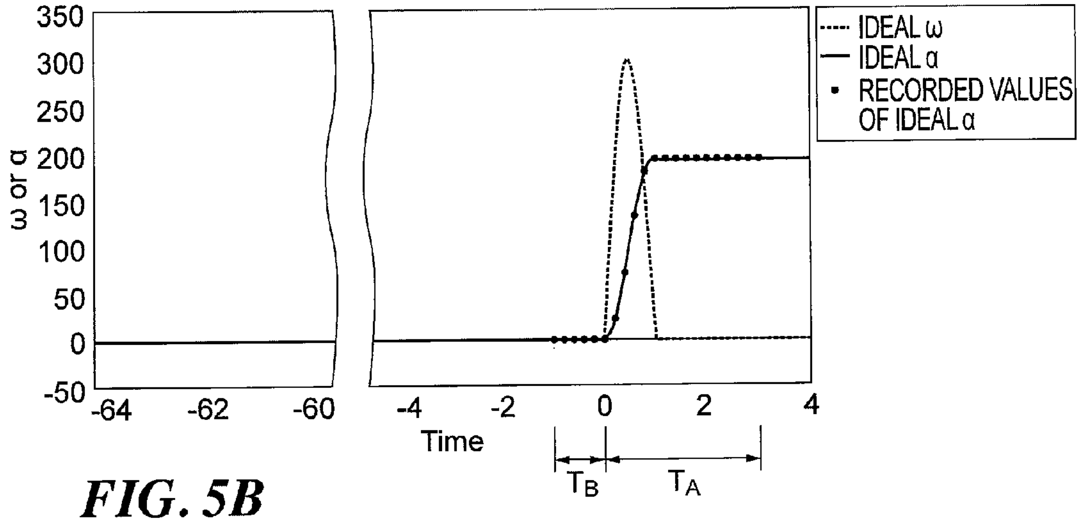
FIG. 5A is a graph illustrating the relationship along the time axis between the ideal angular velocity and the total rotation angle calculated by integrating the ideal angular velocity.
Figure 5B:
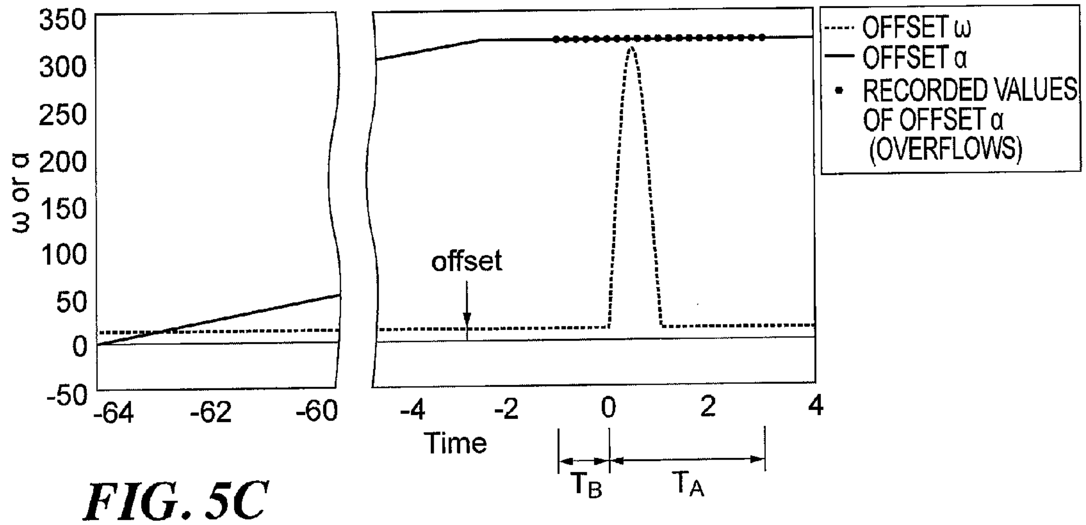
FIG. 5B is a graph illustrating the relationship along the time axis between the angular velocity with an offset and the total rotation angle calculated by integrating the angular velocity with an offset.
Figure 5C:
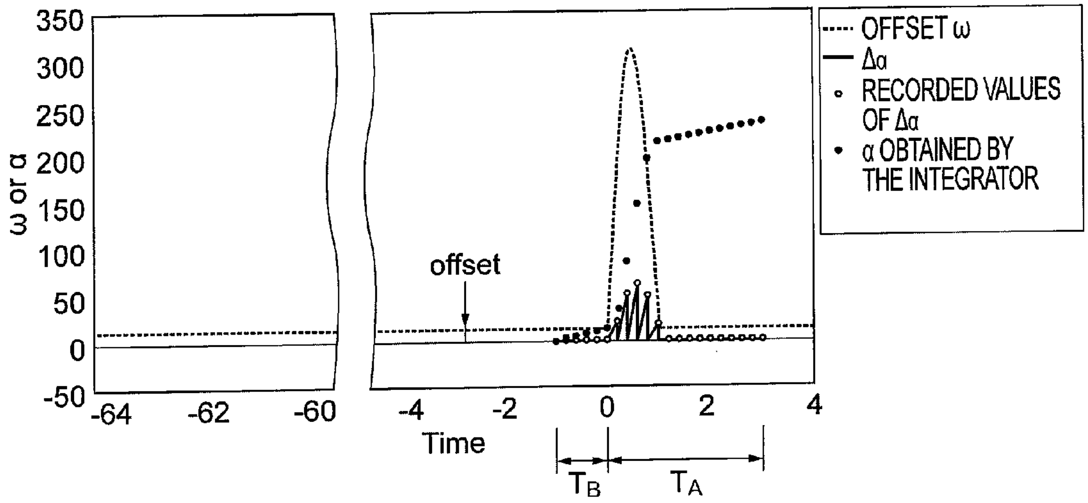
FIG. 5C is a graph illustrating the relationship along the time axis between differential rotation angles, each of which occurs in unit of time, and the total rotation angle calculated by integrating the differential rotation angles.

FIGS. 5A, 5B, and 5C are graphs illustrating, along the time axis, angular velocity $\omega$, differential rotation angle $\Delta\alpha$ in unit of time $\Delta t$ stored in the ring buffer 140 and moved to the nonvolatile recording device 160 at the time of an accident, and the total rotation angle $\alpha$. Those graphs are displayed on a display apparatus 240.

Referring first to FIG. 5A, consider an ideal case where there is no offset in the angular velocity sensor 120, as illustrated by the dashed "IDEAL $\omega$"line. In this case, the same total rotation angle $\alpha$ is obtained as shown by the solid "IDEAL $\alpha$" line, no matter which one is chosen from the following two methods for calculation. According to this embodiment of the present invention, one method is to record the differential rotation angles $\Delta\alpha$, each of which occurs in unit of time $\Delta t$, and later calculate the total rotation angle $\alpha$ by integrating the differential rotation angles $\Delta\alpha$. A second method is to directly record the total rotation angle $\alpha$ by integrating all the past angular velocity $\omega$. The recorded values of the ideal total rotation angle $\alpha$ are obtained as plotted by the black "RECORDED VALUES OF IDEAL $\alpha$" dots shown in FIG. 5A.

Next, consider a case where there is an offset in the angular velocity sensor 120, as illustrated in FIG. 5B. When the method to directly record the total rotation angle $\alpha$ is employed, as shown in FIG. 5B, the total rotation angle $\alpha$ calculated by integrating the angular velocity $\omega$ shown by the dashed "OFFSET $\omega$" line changes as the solid "OFFSET $\alpha$" line. This is because all the past angular velocity $\omega$ including an offset are integrated. Consequently, as illustrated in FIG. 5B, the ring buffer 140 having only a limited capacity becomes saturated (overflows) at a saturation point ($\mp 320°$ in this embodiment) as shown by the solid "OFFSET $\alpha$" line, making it impossible to record the correct total rotation angle $\alpha$ any more as plotted by the black "RECORDED VALUES OF OFFSET $\alpha$" dots.

On the other hand, as illustrated in FIG. 5C, when the method for recording the rotation angle of a vehicle in accordance with the present embodiment is employed, the differential rotation angles $\Delta\alpha$, each of which occurs in unit of time $\Delta t$, are recorded in the ring buffer 140 as shown by the solid "$\Delta\alpha$" line. The differential rotation angles $\Delta\alpha$ return to zero each time the recorded value indicated by the white "RECORDED VALUES OF $\Delta\alpha$" dot is calculated. Thus, the offset included in the angular velocity sensor 120 is effective only for unit of time $\Delta t$ in which integration is performed. As a result, the total rotation angle $\alpha$ indicated by the black "a OBTAINED BY THE INTEGRATOR" dot is obtained by the integrator 220, and the total rotation angle $\alpha$ can be used for investigation of the cause of the accident after the offset portion is corrected, without overflow.

Further, in the present embodiment, the differential rotation angle $\Delta\alpha$ in unit of time $\Delta t$ having a smaller absolute value than the total rotation angle $\alpha$ is stored in the ring buffer 140. It realizes a reduction of the capacity of the ring buffer 140.

The reading of the differential rotation angles $\Delta\alpha$ and integration for calculating the total rotation angle $\alpha$ illustrated in FIG. 5C can be performed at an arbitrary point in time. That is, the data recorded in the nonvolatile recording device 160 may be read after a long period of time has passed, such as several hours or days after an accident, rather than immediately after the accident. According to the present invention, only the differential rotation angles $\Delta\alpha$are recorded so as to prevent saturation of the ring buffer 140, and that it is enough to calculate the total rotation angle $\alpha$ when reading the differential rotation angles $\Delta\alpha$ later.

Figure 6A:
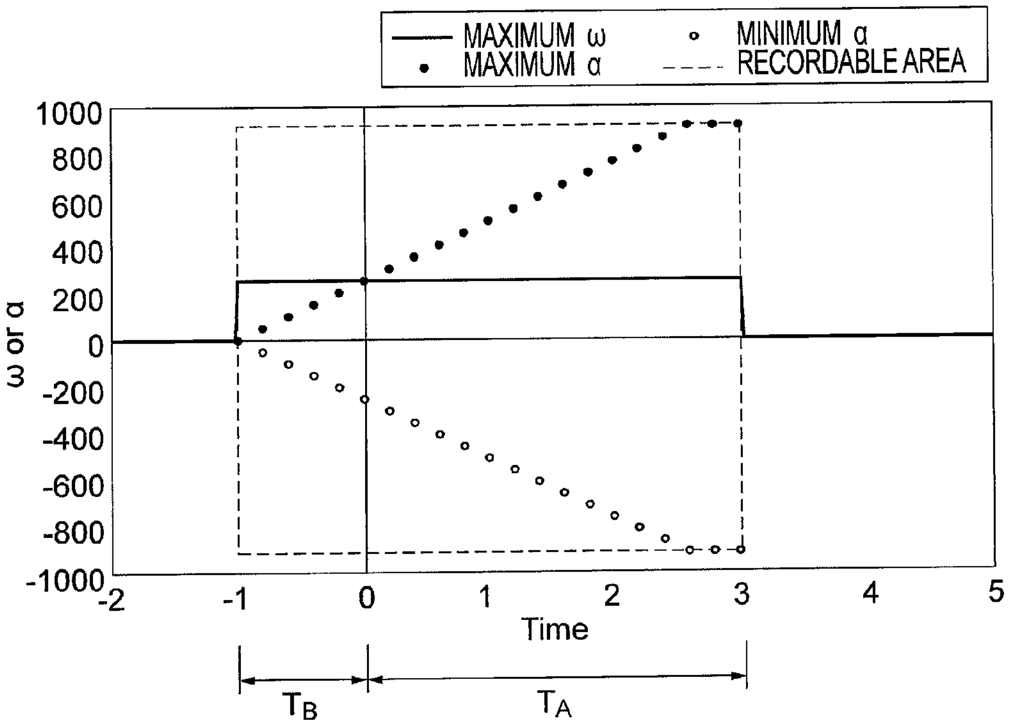
FIG. 6A is a graph illustrating a recordable area of the nonvolatile recording device of FIG. 2A in the case of integrating all the past angular velocity.

FIG. 6A is a graph illustrating a recordable area of the nonvolatile recording device of FIG. 2A in the case of integrating all the past angular velocity. The nonvolatile recording device 160 may be regarded as having the recordable area indicated by the dashed line shown in FIG. 6A. That is, the nonvolatile recording device 160 has a recordable area equivalent to the area of the rectangular shape enclosed by the dashed line.

Using FIG. 6A, consider a case where the total rotation $\alpha$ is recorded in the nonvolatile recording device 160 as a value calculated by integrating all the past angular velocity $\omega$. When the measurement range of the angular velocity sensor is defined by the maximum and minimum angular velocities $\omega$, which can be output by the angular velocity sensor, of ±250°/second indicated by the solid "MAXIMUM $\omega$" line, the maximum and minimum total rotation angles $\alpha$ are as shown respectively by the black and white "MAXIMUM a" and "MINIMUM a" dots. If the nonvolatile recording device 160 has a recordable area defined by the values ±900° indicated by the dashed "RECORDABLE AREA" line as shown in FIG. 6A, then the nonvolatile recording device 160 has an extra needless part of the recordable area which can be never attained by the total rotation $\alpha$, even from the initial minus one (−1) second time point. Besides, immediately before the three (3) second time point, the limit of the recordable area is reached and therefore correct values of the total rotation angle $\alpha$ cannot be recorded any more.

Figure 6B:
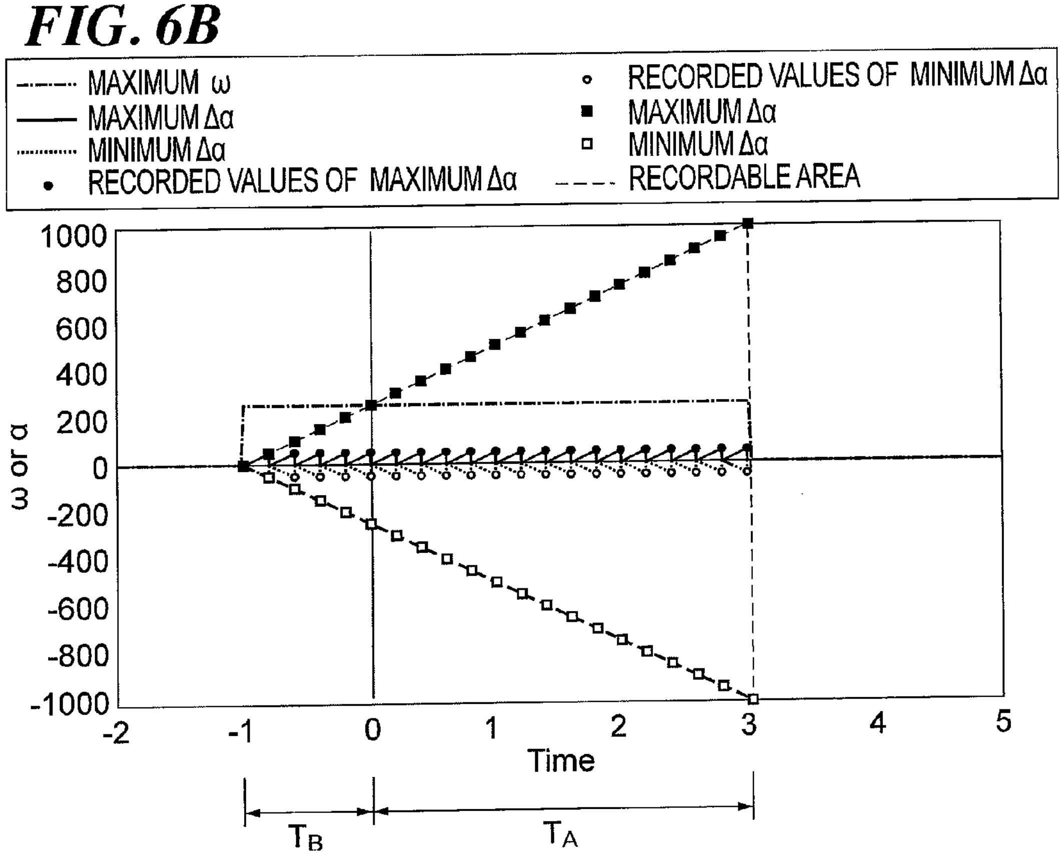
FIG. 6B is a graph illustrating a recordable area of the nonvolatile recording device of FIG. 2A in the case of using the method according to an embodiment of the present invention.

On the other hand, referring now to FIG. 6B, consider a case where the differential rotation angles $\Delta\alpha$, each of which occurs in unit of time $\Delta t$, are recorded in the nonvolatile recording device 160 where the method for recording the rotation angle of a vehicle according to the present embodiment is employed. In this case, the recordable area of the nonvolatile recording device 160 can be optimized as indicated by the dashed "RECORDABLE AREA" line. This recordable area of the nonvolatile recording device 160 is sufficient for storing the integration of the maximum and minimum differential rotation angles $\Delta\alpha$ solid and dotted "MAXIMUM $\Delta\alpha$" and "MINIMUM $\Delta\alpha$" lines) determined based on the measurement range of the angular velocity sensor 120 defined by the maximum and minimum angular velocities $\omega$ of ±250°/second (dashed-dotted "MAXIMUM $\omega$" line). As shown in FIG. 6B, the sufficient recordable area indicated by the dashed "RECORDABLE AREA" line gradually increases along the time axis in the amount of ±50°/$\Delta t$ (as plotted by the black and white "MAXIMUM $\alpha$" and "MINIMUM $\alpha$" squares), which is obtained by integrating the maximum and minimum differential rotation angles $\Delta\alpha$ (solid and dotted "MAXIMUM $\Delta\alpha$" and "MINIMUM $\Delta\alpha$" lines).

That is, the necessary, sufficient, and optimum recordable area can be obtained by giving the small additional recordable area of ±50°/$\Delta t$ to the nonvolatile recording device 160 along the time axis. The optimum recordable area is equivalent to the area of the triangular shape enclosed by the dashed "RECORDABLE AREA" line.

According to the above-described configuration, it is possible to provide the nonvolatile recording device 160 having an optimum capacity for the measurement range of the angular velocity sensor 120, omit waste, and thus maintain a proportionately higher resolution.

As will now be described, the present invention yields an improvement in resolution. In the case where the range ±900° is expressed using 10 bits (1024 gradation levels), 1LSB is equivalent to about 2° ($900\times2/1024\approx2$). On the other hand, in this embodiment, 1LSB is equivalent to about 0.1° ($50\times2/1024\approx0.1$). That is, an accuracy level (resolution) that is approximately twenty times greater is achieved.

Then, such an accuracy level in this embodiment can be maintained using 6 bits (64 gradation levels) ($50\times2/64\approx2$). That is, the same accuracy as in the case where 10 bits are used can be achieved at approximately 60% the recording capacity.

Furthermore, each step of the method for recording the rotation angle of a vehicle of the present embodiment does not necessarily have to be processed serially in time following the sequence described in the flowchart, as the method may include parallel or sub-routine processing.

Apparatus for Recording the Rotation Angle of a Vehicle: Second Embodiment

Figure 7:
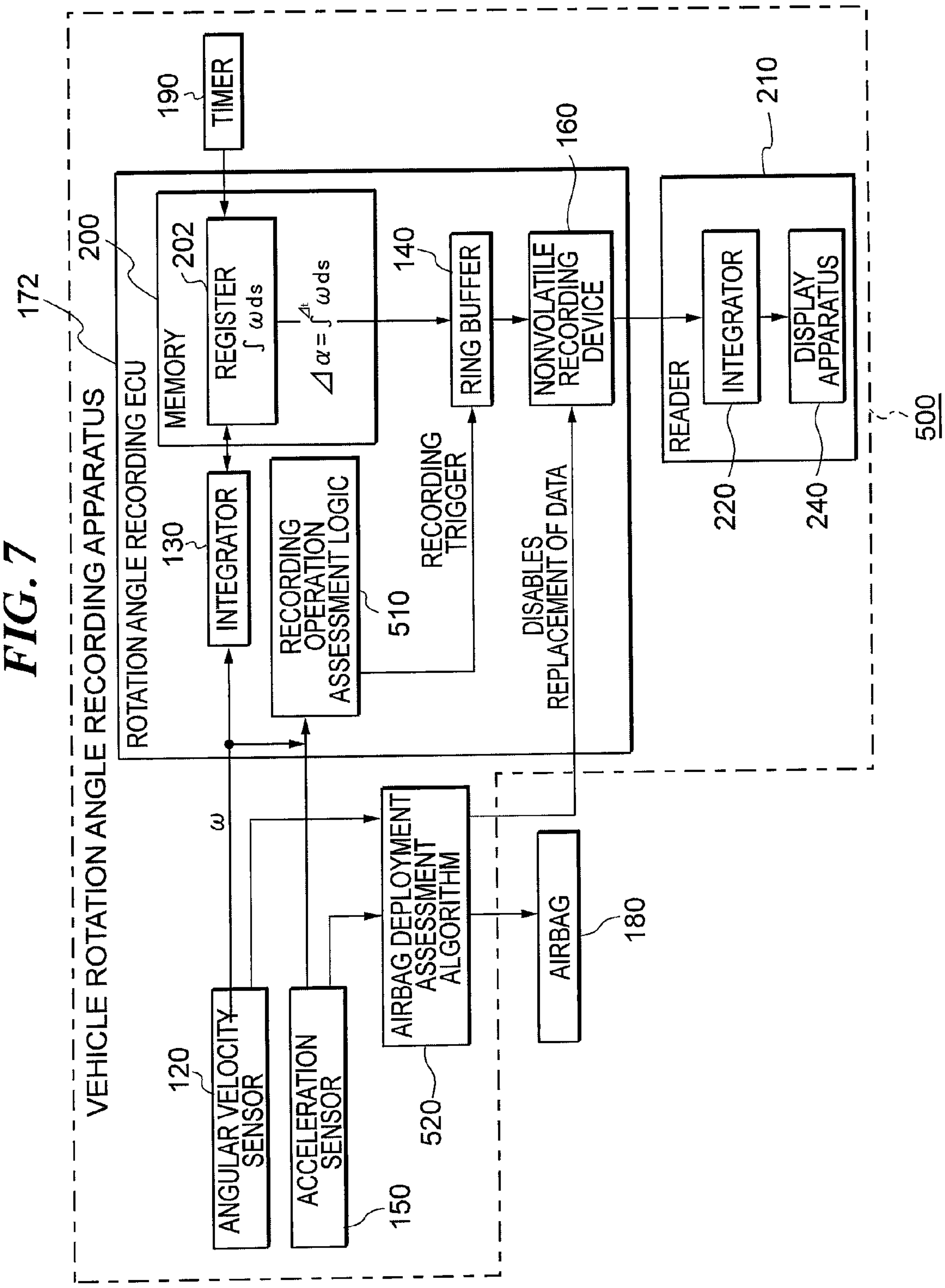
FIG. 7 is a block diagram illustrating an apparatus for recording the rotation angle of a vehicle in accordance with a second embodiment of the present invention.

FIG. 7 is a block diagram illustrating an apparatus 500 for recording the rotation angle of a vehicle according to a second embodiment of the present. The processing flow of the second embodiment is the same as that of the embodiment shown in the flowchart of FIG. 4. The second embodiment is described in the following sections only to the extent features differ from those previously discussed and shown in FIG. 2A. As shown in FIG. 7, the acceleration sensor 150 of the second embodiment detects and outputs acceleration but does not determine anything based on the detected acceleration. It is the recording operation assessment logic 510 in the rotation angle recording ECU 172 that determines whether or not acceleration exceeds the first threshold and outputs the recording trigger (shown in step S340 of FIG. 4) when acceleration exceeds the first threshold. The recording operation assessment logic 510 also receives the angular velocity co from the angular velocity sensor 120 and may output the recording trigger when the angular velocity $\omega$ satisfies a predetermined condition. Otherwise, it may output the recording trigger when both of acceleration and the angular velocity co satisfy predetermined conditions.

The ring buffer 140 of the second embodiment is located within the memory 200, unlike the first embodiment. However, the function of the ring buffer 140 is the same.

In the first embodiment, the airbag deployment sensor 230 detects airbag deployment and outputs a signal, and then the airbag deployment assessment algorithm 204 receives the signal and disables replacement of data recorded in the nonvolatile recording device 160. On the other hand, in the second embodiment, an airbag deployment assessment algorithm 520, located outside the ECU 172, receives the angular velocity $\omega$ and acceleration respectively from the angular velocity sensor 120 and the acceleration sensor 150. Based on the received angular velocity $\omega$ and acceleration, the airbag deployment assessment algorithm 520 determines whether or not the airbag 180 should be deployed. When the airbag 180 has been deployed (branch "YES" from step S370 of FIG. 4), the airbag deployment assessment algorithm 520 disables replacement of data recorded in the nonvolatile recording device 160 at the same time (as shown in step S380 of FIG. 4).

The functions of the timer 190 are the same in both the first and second embodiments. As shown in FIG. 7, the recording to the register 202 and the ring buffer 140 is performed in accordance with timing supplied by the timer 190, though it is not evidently shown in FIG. 2A.

While the preferred embodiment of the present invention has been described with reference to the accompanying drawings, the invention is not to be restricted by the embodiment. Unless particularly stated in this specification that the scope of the invention is limited, the present invention is not restricted to the shapes, sizes, or layout of the detailed components that are shown in the accompanying drawings. Further, the expressions and terms used in this specification are used for the purpose of explanation and, unless particularly stated that the scope of the invention is limited, the present invention is not restricted thereto.

It will be appreciated by those skilled in the art that various other changes and modifications can be made without departing from the spirit and scope described in the claims. All such changes and modifications are also understood to fall within the technical scope of the present invention.

The invention claimed is:

1. A method for recording the rotation angles of a vehicle comprising the steps of:

measuring an angular velocity of the vehicle;

integrating the measured angular velocity across a predetermined unit of time to calculate a differential rotation angle in unit of time;

storing the differential rotation angle in a buffer; and when a vehicle accident is detected, recording in a recording device a plurality of differential rotation angles stored in the buffer across a predetermined recording time before and after the accident.

2. The method for recording rotation angles of a vehicle according to claim 1, further comprising the steps of:

reading the plurality of differential rotation angles recorded in the recording device; and subsequently integrating the plurality of differential rotation angles to calculate a total rotation angle at an arbitrary point in time within the recording time.

3. The method for recording the rotation angles of a vehicle according to claim 1, further comprising the steps of:

detecting whether or not an airbag of the vehicle has been deployed; and disabling replacement of the plurality of differential rotation angles recorded in the recording device if the airbag has been deployed.

4. An apparatus for recording rotation angles of a vehicle comprising:

an angular velocity sensor for measuring an angular velocity of the vehicle;

an integrator for integrating the measured angular velocity across a predetermined unit of time to calculate a differential rotation angle in unit of time;

a buffer for storing a plurality of differential rotation angles;

an accident sensor for detecting vehicle accidents; and a recording device for recording, when an accident is detected by the accident sensor, the plurality of differential rotation angles stored in the buffer across a predetermined recording time before and after the accident.

5. The apparatus for recording rotation angles of a vehicle according to claim 4, further comprising:

a reader for reading the plurality of differential rotation angles recorded in the recording device; and an integrator for subsequently integrating the plurality of differential rotation angles to calculate a total rotation angle at an arbitrary point in time within the recording time.

6. The apparatus for recording rotation angles of a vehicle according to claim 4, wherein the buffer is a ring buffer capable of storing the plurality of differential rotation angles, and wherein each of the plurality of differential rotation angles occurs in unit of time, across the recording time.

7. The apparatus for recording rotation angles of a vehicle according to claim 4, further comprising an airbag deployment sensor for detecting whether or not an airbag of the vehicle has been deployed, wherein replacement of the plurality of differential rotation angles recorded in the recording device is disabled when the airbag deployment sensor detects an airbag deployment.

8. The apparatus for recording rotation angles of a vehicle according to claim 4, wherein a recordable area of the recording device gradually increases along a time axis in an amount equivalent to a maximum or minimum differential rotation angle in unit of time, the maximum or minimum differential rotation angle in unit of time being determined based on a maximum or minimum angular velocity that can be output by the angular velocity sensor.

9. The method for recording the rotation angles of a vehicle according to claim 1, wherein the plurality of differential rotation angles include the differential rotation angle.

10. The apparatus for recording rotational angles of a vehicle according to claim 4, wherein the plurality of differential rotation angles include the differential rotation angle.

* * * * *